United States Patent [19]
Bethel et al.

[11] Patent Number: 5,786,571
[45] Date of Patent: Jul. 28, 1998

[54] WRAPPED TEMPERATURE SENSING ASSEMBLY

[75] Inventors: Reginald Keith Bethel, Lexington; Robert Leonard Burdick, Nicholasville; Charles Jerome Cheek, Versailles; Larry Steven Foster, Lexington; Paul Douglas Horrall, Lexington; Krikor Yosmali, Lexington, all of Ky.

[73] Assignee: Lexmark International, Inc., Lexington, Ky.

[21] Appl. No.: 853,993

[22] Filed: May 9, 1997

[51] Int. Cl.$^6$ .................................................. H05B 1/02
[52] U.S. Cl. .................... 219/494; 219/216; 219/505; 399/94; 399/330; 374/199; 374/208; 355/133
[58] Field of Search .................... 219/494, 216, 219/497, 499, 505, 504; 399/94–96, 330, 331, 332; 374/158, 199, 208; 355/133

[56] References Cited

U.S. PATENT DOCUMENTS

| | | | |
|---|---|---|---|
| 4,232,959 | 11/1980 | Ateya et al. | 355/3 FU |
| 4,672,177 | 6/1987 | Headrick | 219/216 |
| 4,745,430 | 5/1988 | Tsuchiya | 355/3 FU |
| 4,949,131 | 8/1990 | Ito | 355/282 |
| 4,994,852 | 2/1991 | Matsuuchi et al. | 355/206 |
| 5,032,874 | 7/1991 | Matsuuchi | 355/285 |
| 5,213,417 | 5/1993 | Yamada et al. | 374/183 |
| 5,281,793 | 1/1994 | Gavin et al. | 219/216 |
| 5,287,155 | 2/1994 | Arai et al. | 355/285 |
| 5,300,996 | 4/1994 | Yokoyama et al. | 355/285 |
| 5,329,342 | 7/1994 | Shirai et al. | 355/285 |
| 5,557,385 | 9/1996 | Tanaka et al. | 355/285 |

*Primary Examiner*—Mark H. Paschall
*Attorney, Agent, or Firm*—John A. Brady

[57] ABSTRACT

The temperature of a heated roller (1) is monitored by a heat sensor (19) which rests on metal rectangle (25) on polyimide strip (5). The top end of the strip is attached directly to the frame (3), the bottom end of the strip has a hole (7), which receives an arm (9a) of pivoted member (9). A coil spring (13) pivots member 9 to cause arm 9a to pull the strip into contact with the heated roller. Because of the wide contact and low force between the strip and the roller, wear is reduced and smooth operation is realized.

5 Claims, 2 Drawing Sheets

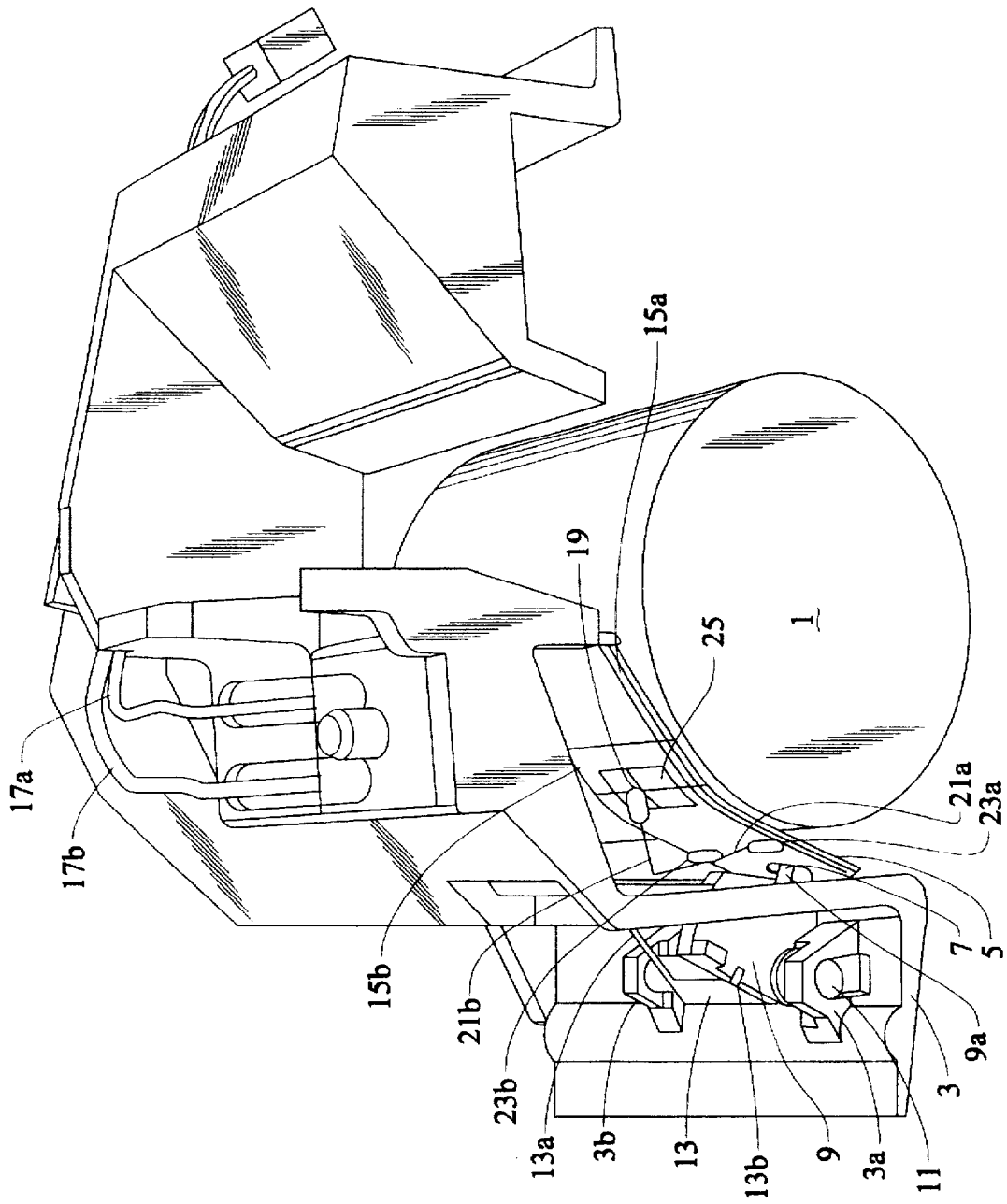

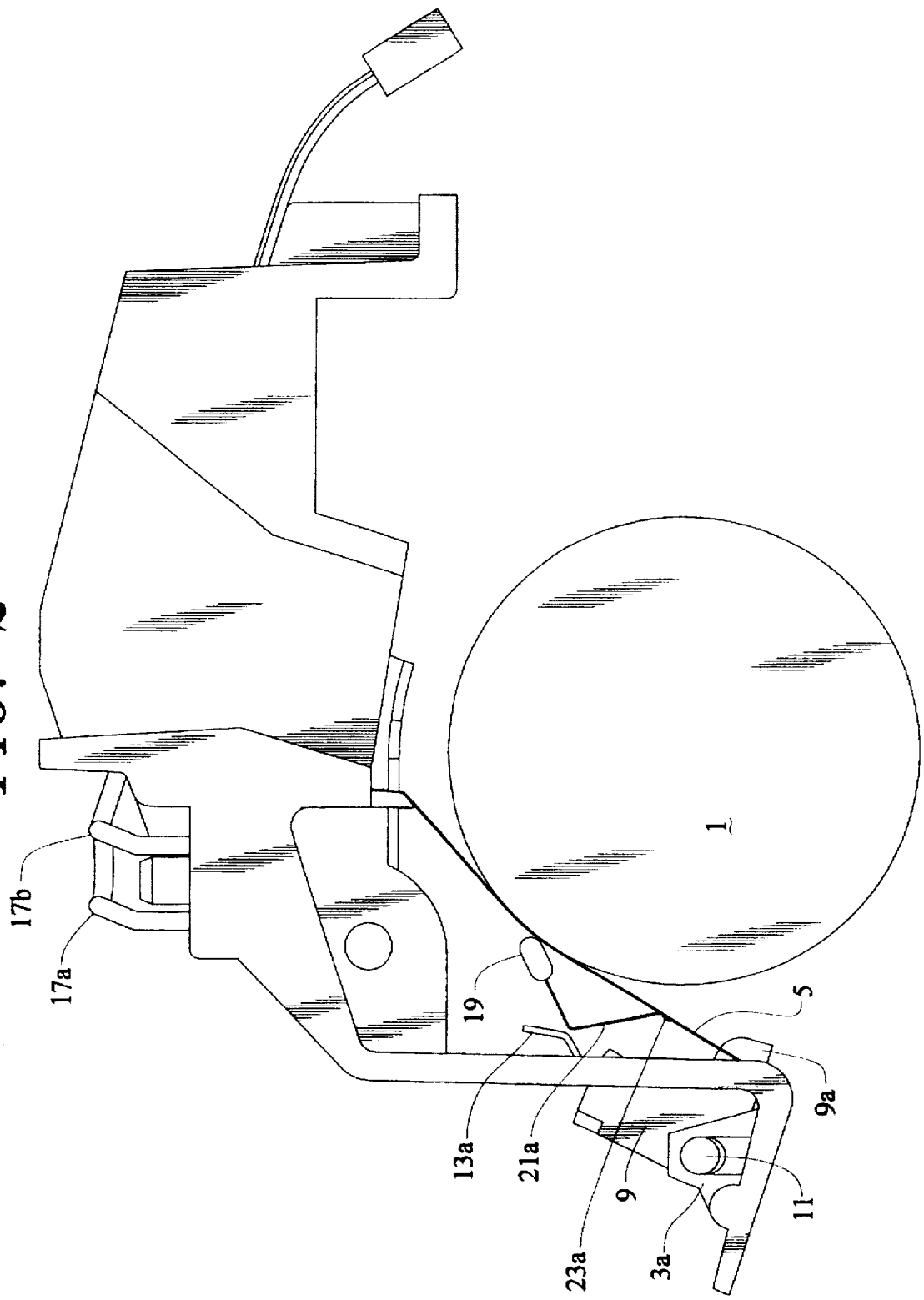

WRAPPED TEMPERATURE SENSING ASSEMBLY

TECHNICAL FIELD

This invention relates to assemblies to position a thermistor to sense temperature of a roller or other member having a curved surface.

BACKGROUND OF THE INVENTION

In a typical electrophotographic printing process, toner is fused to the paper or other media receiving the final image. In desktop printers this fusing is normally done by passing the toned media through the nip of a heated roller, which contacts the toned side of the media, and a soft back-side roller. The heated roller typically is an aluminum dram with a flouropolymer outer layer. The combined action of heat, pressure, and dwell time in the nip causes the toner, which is thermoplastic, to soften and flow between paper fibers or to coalesce on the surface of a transparency. Upon cooling the toner solidifies and is affixed to the media.

A critical part of such fixing is maintaining control of the surface temperature of the heated roller. A traditional temperature sensor assembly is a thermistor and a foam or rubber part to hold the thermistor body in place against a metal surface which is bonded to a polyimide film or strip. The polyimide is the material which contacts the heated roller. This assembly is mounted on a cantilevered bracket having a central compression spring with an assembly of the foam or rubber, the thermistor, the metal layer and the polyimide layer movable by the spring into contact with the heated roller.

This method of loading results in a relatively high normal force on the heated roller, which contributes to wear of the flouropolymer surface of the heated roller. The foam or rubber piece has a stiffness which tends to cause high contact stress areas by making line or point contact with the fusing roller. Also, the entire thermistor assembly, including the slow responding foam or rubber element, must be heated to operating temperature before proper temperature sensing can occur.

U.S. Pat. No. 4,672,177 to Headrick discloses a temperature sensor held against a roller by its electrical leads.

DISCLOSURE OF THE INVENTION

In accordance with this invention a heat resistant strip of flexible material is wrapped across a sector of a heated roller. At least one end of the strip is held under controlled pressure. The heat sensing body of a thermistor is held by a wire from the body connected to the strip. The wire has an intermediate bend which locates the thermistor so as to apply pressure on the heat sensing body against the strip.

Preferably, the strip has a hole near one end and a hook on a rotatable member engages that hole. A spring biases the rotatable member to pull the strip into contact with the roller.

The strip thereby contacts a substantial area of the roller to reach a temperature which is more representative of the roller temperature than a smaller contact. The assembly reaches operating temperature virtually without delay since the strip is in direct contact with the roller and is a thin solid which heats quickly. The normal force of the strip is low, which reduces surface wear from that of conventional thermistor assemblies.

Of course, the temperature sensor may take any form having a solid sensing body, for example it may be a thermocouple.

BRIEF DESCRIPTION OF THE DRAWING

The details of this invention will be described in connection with the accompanying drawing, in which FIG. 1. is a perspective view showing the temperature sensing assembly by a view sectioned immediately prior to that assembly, and FIG. 2 is a side view of the assembly.

BEST MODE FOR CARRYING OUT THE INVENTION

Referring to FIG. 1, a heated roller 1 is mounted in proximity with a stationary frame 3. Frame 3 is a part of an imaging device such as a laser printer (not shown) and roller 1 is a conventional fixing roller in the laser printer, which extends across the imaging region of the printer.

Polyimide sheet or strip 5 is fixedly mounted at its top end to the frame 3 as by a stud (not shown) through a matching hole in sheet 5 or by a clasp or other holder. The lower end of sheet 5 is yieldably held through hole 7 in sheet 5.

Hole 7 receives an arm 9a in a member 9, which is pivoted on a shaft 9b in member 9. Shaft 9b is held by and pivots in frame extensions 3a and 3b. A coil spring 13 wound on shaft 9b has a tang 13a which is held against unwinding by frame 3 and a tang 13b which engages member 9.

Spring 13 is wound so as to apply force on member 9 clockwise as shown in the drawings. This brings arm 9a against hole 7 to tighten strip 5, which wraps strip 5 against a curved sector of the surface of roller 1.

Strip 5 has copper traces 15a and 15b on opposite sides. These receive electrical power from wires 17a and 17b by direct contact, as is conventional. A thermistor has a solid, heat sensing body 19 and two metal wires 21a and 21b. Wire 21a is attached to trace 15a by solder mound 23a, and wire 21b is attached to trace 15b by solder mound 23b. (Since traces 15a, 15b are firmly attached to strip 5, wires 21a 21b are thereby firmly attached to strip 5.)

A thin metal rectangle 25 is attached to strip 5 centered under the location of sensing body 19. Metal 25 is much larger than the size of sensing body 19 and is therefore effective to integrate the temperature sensed by body 19 over a region generally coinciding with at least the region under metal 25.

Wires 21a and 21b are bent so as to position sensing body 19 in pressure contact region 25, as wires 21a, 21b are of resilient metal.

Operation is inherent and without substantial movement of the assembly of strip 5, metal rectangle 25, sensing body 19, and wires 21a, 21b. Roller 1 rotates in contact with strip 5, bringing different regions of its surface under sensing body 19.

Because of the long and wide region of contact between strip 5 and roller 1, excessive forces are reduced. Also, the load applied to sheet 5 by member 9 is nearly perpendicular to the normal force on heated roller 1. This results in a normal force which is much lower than the applied force along strip 5. Wear is greatly reduced and smooth operation occurs.

Variations will be apparent and can be anticipated.

What is claimed is:

1. An assembly to sense the surface temperature of a member having an extended, curved surface comprising a flexible, heat resistant-strip having a first end at one end of said strip and a second end at the opposite end of said strip, said strip being mounted at said first end and at said second end to wrap around and contact at least part of said curved surface, at least one of said first end and said second end being mounted under yieldable pressure, and a temperature sensor comprising a solid, heat sensing body and at least one resilient wire extending from said heat sensing body and having a bent portion, said at least one resilient wire being mounted on said strip to position said heat sensing body in contact with said strip with said bent portion applying pressure on said heat sensing body toward said strip.

2. The assembly as in claim 1 in which said strip is polyimide having a hole near at least one of said first end and said second end, and also containing a rotatable member with an arm extending through said hole and a spring biasing said rotatable member to pull said strip against said curved surface of said member.

3. The assembly as in claim 1 in which said at least one resilient wire comprises electrical leads to provide electrical connection for function of said heat sensing body to sense temperature.

4. The assembly as in claim 3 in which said strip is polyimide having a hole near at least one of said first end and said second end, and also containing a rotatable member with an arm extending through said hole and a spring biasing said rotatable member to pull said strip against said curved surface of said member.

5. The assembly as in claim 4 in which said strip has conductive laminations coated on it and said electrical leads are soldered to different ones of said conductive laminations.

* * * * *